(12) United States Patent
Gokhale et al.

(10) Patent No.: US 10,472,444 B2
(45) Date of Patent: Nov. 12, 2019

(54) METHOD FOR THE PREPARATION OF COPOLYMERS OF ALKYL METHACRYLATES AND MALEIC ANHYDRIDE

(71) Applicant: Evonik Oil Additives GmbH, Darmstadt (DE)

(72) Inventors: Rhishikesh Gokhale, Darmstadt (DE); Sandra Gebhardt, Otzberg (DE); Miriam Kathrin Stihulka, Maintal (DE); Klaus Schimossek, Bensheim (DE); Frank-Olaf Maehling, Mannheim (DE)

(73) Assignee: Evonik Oil Additives GmbH, Darmstadt (DE)

( * ) Notice: Subject to any disclaimer, the term of this patent is extended or adjusted under 35 U.S.C. 154(b) by 0 days.

(21) Appl. No.: 16/035,232

(22) Filed: Jul. 13, 2018

(65) Prior Publication Data

US 2018/0319919 A1   Nov. 8, 2018

Related U.S. Application Data

(62) Division of application No. 15/537,180, filed as application No. PCT/EP2015/080074 on Dec. 16, 2015.

(30) Foreign Application Priority Data

Dec. 18, 2014 (EP) .................................... 14198787

(51) Int. Cl.
| | |
|---|---|
| *C08F 222/06* | (2006.01) |
| *C08F 222/08* | (2006.01) |
| *C08F 2/10* | (2006.01) |
| *C08F 220/18* | (2006.01) |
| *C10M 145/16* | (2006.01) |
| *C10M 145/14* | (2006.01) |
| *C08F 22/06* | (2006.01) |

(52) U.S. Cl.
CPC .............. *C08F 222/06* (2013.01); *C08F 2/10* (2013.01); *C08F 220/18* (2013.01); *C08F 222/08* (2013.01); *C08F 22/06* (2013.01); *C10M 145/14* (2013.01); *C10M 145/16* (2013.01)

(58) Field of Classification Search
CPC ....... C08F 222/06; C08F 222/08; C08F 22/06
See application file for complete search history.

(56) References Cited

U.S. PATENT DOCUMENTS

| | | | |
|---|---|---|---|
| 5,178,641 A | 1/1993 | Konrad et al. | |
| 5,585,337 A | 12/1996 | Day et al. | |
| 5,721,201 A * | 2/1998 | Tomassen ............. | C08F 220/18 508/469 |
| 6,140,431 A * | 10/2000 | Kinker ..................... | C08F 2/00 526/79 |
| 6,231,799 B1 | 5/2001 | Kempf et al. | |
| 6,583,092 B1 | 6/2003 | Carrick et al. | |
| 6,902,772 B2 * | 6/2005 | Takeda .................. | C08F 230/08 427/515 |

FOREIGN PATENT DOCUMENTS

| | | |
|---|---|---|
| CN | 1302031 C | 2/2007 |
| CN | 1328392 C | 7/2007 |
| EP | 0 485 773 A1 | 5/1992 |
| EP | 0 636 637 A2 | 2/1995 |
| EP | 0 636 637 B2 | 2/1995 |
| EP | 0 673 990 A1 | 9/1995 |

OTHER PUBLICATIONS

International Search Report dated Jan. 21, 2016 in PCT/EP2015/080074 filed Dec. 16, 2015.
Written Opinion dated Jan. 21, 2016 in PCT/EP2015/080074 filed Dec. 16, 2015.

* cited by examiner

*Primary Examiner* — Ling Siu Choi
*Assistant Examiner* — David L Miller
(74) *Attorney, Agent, or Firm* — Oblon, McClelland, Maier & Neustadt, L.L.P.

(57) ABSTRACT

The present invention relates to a method for the preparation of a sulfur-free copolymer comprising at least one alkyl methacrylate and maleic anhydride having a number average molecular weight of 3000 to 9000 g/mol by solution polymerization in the presence of a radical initiator.

2 Claims, No Drawings

METHOD FOR THE PREPARATION OF COPOLYMERS OF ALKYL METHACRYLATES AND MALEIC ANHYDRIDE

CROSS REFERENCE TO RELATED APPLICATIONS

This application is a divisional application of prior U.S. application Ser. No. 15/537,180 filed Jun. 16, 2018, the disclosure of which is incorporated herein by reference in its entirety. U.S. application Ser. No. 15/537,180 is the national stage of PCT/EP2015/080074, filed Dec. 16, 2015, the disclosure of which is incorporated herein by reference in its entirety. U.S. application Ser. No. 15/537,180 claims priority to European Application No. 14198787.5 filed Dec. 18, 2014, the disclosure of which is incorporated herein by reference in its entirety.

BACKGROUND OF THE INVENTION

Field of the Invention

The present invention relates to a process for the preparation of copolymers of alkyl methacrylates and maleic anhydride having a number average molecular weight of 3000 to 9000 g/mol by solution polymerization in the presence of a radical initiator.

Alkyl (meth)acrylate/maleic anhydride copolymers are known to act as so called flow improvers for hydrocarbon oils such as gas oils, diesel oils, fuel oils, lubricating oils and crude oils. These oils contain a large proportion of long-chain n-paraffins, which crystallize upon cooling and lead to an increased oil viscosity and decreased oil flowability at low temperatures. Alkyl (meth)acrylate/maleic anhydride copolymers can inhibit the crystallization of long-chain n-paraffins and can therefore improve the flow properties of hydrocarbon oils at low temperatures.

Alkyl (meth)acrylate/maleic anhydride copolymers can be prepared by solution polymerization in the presence of a radical initiator. This method requires a solvent, in which both monomers are soluble. Suitable solvents are for example toluene, xylene, methylbenzene, cumene, high boiling point mixtures of aromatics, aliphatic and cyclic aliphatic hydrocarbons, paraffin oils, tetrahydrofuran, and dioxane. Several examples of solution polymerization processes are described in the art.

Description of the Background

CN 1328392 C describes a solution polymerization process, in which an initial solution of maleic anhydride in xylene containing the chain transfer agent n-dodecyl mercaptan is provided at a reaction temperature of 140° C. Two separate solutions containing a radical initiator (di-tert-butyl peroxide) and octadecyl methacrylate, respectively, are then added dropwise to the maleic anhydride solution. Here, addition of octadecyl methacrylate continues even after addition of the initiator has been completed. The resulting copolymer comprises sulfur as a result of the chain transfer agent, which is not desirable for numerous applications which need low-sulfur or even sulfur-free additives.

CN 1302031 C describes a copolymerization process, in which an initial solution of maleic anhydride and tetradecyl methacrylate in toluene is provided at a reaction temperature of 60° C. The initiator (AIBN) is then added to this solution in a single step to start the reaction.

EP 0673990 A1 discloses hydrocarbon oil compositions comprising copolymers made out of at least one $C_8$ to $C_{40}$ alkyl acrylate units and maleic anhydride units together with at least one additive selected from the group consisting of a homopolymer or copolymer derived from an unsaturated hydrocarbon monomer, an ester and a wax anti-settling additive for improving the cold flow properties of a hydrocarbon oil. All the copolymers disclosed in EP0673990 A1 are made out of maleic anhydride and alkyl acrylate. For the polymerization process, reference is made to the process described in EP 0636637 A2.

EP 0636637 A2 describes a solution polymerization process, in which first a solution of maleic anhydride in toluene is provided at a reaction temperature of 80° C. and is then supplemented with radical initiator (AIBN). After addition of the initiator, a solution of an alkyl acrylate in toluene is slowly added over the course of 100 minutes. In a final step, the obtained alkyl acrylate-maleic anhydride copolymers are purified by dialysis in order to remove the unreacted monomers. All examples provided in EP 0636637 A2 are directed to the polymerization of alkyl acrylate with maleic anhydride.

U.S. Pat. No. 5,178,641 A describes a solution polymerization process, in which a first solution of lauryl acrylate and maleic anhydride in a high boiling point mixture of aromatics (solvesso 150) is provided at a reaction temperature of 100° C. Two separate solutions comprising a radical initiator (tert-butyl-per-2-ethyl hexanoate) in solvesso 150 and lauryl acrylate in solvesso 150, respectively, are then slowly added to the first solution. Here, addition of the initiator continues after addition of lauryl acrylate has been completed. All examples provided in U.S. Pat. No. 5,178,641 A are directed to the polymerization of lauryl acrylate with maleic anhydride.

It is well known in the art that acrylates react differently than methacrylates (e.g. *J. Phys. Chem. A* 2008, 112, 6772-6782) and it is therefore a challenge to find out adequate reaction conditions in order to improve reaction yields and monomer conversions in a copolymerization reaction with alkyl methacrylates and comonomers, while keeping control over the number average molecular weight.

In the special case where the comonomer is maleic anhydride, the challenge is even higher because the comonomer maleic anhydride is known to have a low reactivity and an excess of maleic anhydride in the reaction solution is usually used as shown in CN 1302031 C, since the known solution polymerization processes suffer from a low conversion of maleic anhydride into the resulting copolymer. However, using an excess of maleic anhydride leads to the problem that polymer chain growth is hindered as soon as all the alkyl methacrylate monomers are consumed, and such processes need an additional purification step to get rid of the unreacted maleic anhydride. This is also the reason why it is difficult to achieve obtaining alkyl methacrylate-maleic anhydride copolymers with high weight average molecular weight, because the excess of maleic anhydride may stop the chain growth.

It was therefore an object of the present invention to develop a process for the preparation of alkyl methacrylate-maleic anhydride copolymers leading to high yields and high monomer conversions for both alkyl methacrylate and maleic anhydride monomers, without any purification step. In particular, it would be desirable to prepare, with high yields and high monomer conversions, sulfur-free copolymers with equimolar contents of alkyl methacrylate and maleic anhydride, which have the required number average molecular weights.

A further challenge was to find reaction conditions that allow controlling the number average molecular weight of the copolymer while maintaining high conversion rate of maleic anhydride into the copolymer, which means a number average molecular weight falling in the range of 3000 to 9000 g/mol together with a low residual or unreacted maleic anhydride in the copolymerization reaction mixture.

SUMMARY OF THE INVENTION

Therefore, the aim of the present invention is to provide a method for the preparation of sulfur-free alkyl methacrylate/maleic anhydride copolymers having a number average molecular weight of 3000 to 9000 g/mol, being the number average molecular weight determined by gel permeation chromatography against poly(methyl methacrylate) standards, wherein a high conversion of maleic anhydride can be achieved. The size distribution of the copolymers should be characterized by a polydispersity index (defined as the ratio of the weight average molecular weight to the number average molecular weight) of 1 to 5, being the polydispersity index determined by gel permeation chromatography against poly(methyl methacrylate) standards. According to the claimed process, the molar ratio of the one or more alkyl methacrylate to the maleic anhydride in the resulting copolymer is in the range of 10:1 to 1:1, more preferably of 2:1 to 1:1, based on the total molar amounts of these monomers used for the preparation of the copolymer. Even more preferably, the method should allow the synthesis of copolymers at a molar ratio of alkyl methacrylate to maleic anhydride in the monomer mixture of close to 1:1.

DETAILED DESCRIPTION OF THE PREFERRED EMBODIMENTS

It has surprisingly been found that copolymers of the desired molecular weight can be prepared in a solution polymerization process, in which two separate feed solutions are slowly added to an initial solution comprising alkyl methacrylate and maleic anhydride, wherein the first feed solution comprises alkyl methacrylate and a radical initiator, and the second feed solution comprises maleic anhydride without any radical initiator. It is essential that the additions of both first and second feed solutions are started at the same time, and the duration of the additions of the first and second feed solutions are adjusted such that addition of the first feed solution is completed faster than the addition of the second feed solution. As shown in the examples provided herein below, the copolymers prepared according to the claimed process all have a number average molecular weight comprised in the desired range and the residual content of each monomer, maleic anhydride and alkyl methacrylate, is on an exceptionally low level.

Consequently, the present invention relates to a method for the preparation of a sulfur-free copolymer comprising alkyl methacrylate monomer units and maleic anhydride monomer units by solution polymerization of one or more alkyl methacrylates and maleic anhydride in a solvent in the presence of a radical initiator, said method comprising the steps of
a) providing an initial reaction solution comprising a portion of the one or more alkyl methacrylates, a portion of the maleic anhydride, a portion of the initiator and a portion of the solvent;
b) adding a first feed solution comprising a further portion of the maleic anhydride and a further portion of the solvent to the initial reaction solution, and without any initiator; and
c) adding a second feed solution comprising a further portion of the one or more alkyl methacrylates and a further portion of the radical initiator wherein the additions of both first and second feed solutions are started at the same time, and the duration of the additions of the first and second feed solutions are adjusted such that addition of the first feed solution is completed faster than the addition of the second feed solution, and
wherein the sulfur-free copolymer has a number average molecular weight of 3000 to 9000 g/mol, being the number average molecular weight determined by gel permeation chromatography against poly(methyl methacrylate) standards, and a polydispersity index in the range of 1 to 5, being the polydispersity index determined by gel permeation chromatography against poly(methyl methacrylate) standards, and
wherein the molar ratio of the one or more alkyl methacrylate to the maleic anhydride in the copolymer is in the range of from 10:1 to 1:1, based on the total molar amounts of these monomers, namely, the one or more alkyl methacrylates and the maleic anhydride, used for the preparation of the copolymer.

The inventors of the present invention have found that by combining the radical initiator and a further portion of the second monomer in a single feed solution, rather than using two separate feed solutions as in the prior art, and by adding a further portion of maleic anhydride through a second feed solution, the number average molecular weight of the copolymers can be efficiently controlled and the conversion rate of maleic anhydride into the resulting copolymer can be increased.

The reaction may be carried out at a reaction temperature that is limited by the boiling point of the reactants. Preferably, the reaction temperature is in the range of 40 to 200° C., more preferably 60 to 140° C., even more preferably 80 to 120° C., most preferably 90 to 110° C. Typically, the initial reaction solution is heated to the desired reaction temperature before addition of the feed solutions.

An important feature of the present method is that the first feed solution is added stepwise to the initial reaction solution. Likewise the second feed solution is added stepwise to the initial reaction solution.

In one embodiment, the first feed solution is preferably added over the course of 30 minutes to 12 hours, more preferably 1 to 6 hours, even more preferably 2 to 4 hours, most preferably 2.5 to 3.5 hours.

The second feed solution is preferably added over the course of 30 minutes to 12 hours, more preferably 2 to 10 hours, even more preferably 5 to 7 hours, most preferably 5.5 to 6.5 hours.

The additions of both feed solutions are started at the same time, while the duration of the feeds may differ. Addition of the initiator and of the one or more alkyl methacrylates continues after all of the maleic anhydride has been added to the reaction solution. This ensures a complete conversion of the maleic anhydride. Thus, the duration of the addition of the first and second feed solution is adjusted such that addition of the first feed solution is completed faster than the addition of the second feed solution.

Typically, the reaction solution is continuously stirred during addition of the feed solutions.

Both, the initial reaction solution and the second feed solution contain a portion of the one or more alkyl methacrylates. Preferably, the portion of the one or more alkyl methacrylates in the initial reaction solution is 5-25 wt-% based on the total amount of the one or more alkyl methacrylates, more preferably 7-20 wt-%, most preferably 8-14 wt-%. The portion of the one or more alkyl methacrylates in the second feed solution preferably is 75 to 95 wt-% based on the total amount of the one or more alkyl methacrylates, more preferably 80 to 93 wt-%, even more preferably 86 to 92 wt-%, based on the total amount of the one or more alkyl methacrylates. Preferably, the sum of the portions of the one or more alkyl methacrylates in the initial reaction solution and the second feed solution is 50 to 100 wt-% based on the total amount of the one or more alkyl methacrylates, more preferably 90 to 100 wt-%, even more preferably 100 wt-%, based on the total amount of the one or more alkyl methacrylates.

In a preferred embodiment, the first feed solution does not comprise any alkyl methacrylates.

Preferably, the one or more alkyl methacrylates are only added to the reaction as a part of the initial reaction solution and the second feed solution. In a preferred embodiment, the portion of the one or more alkyl methacrylates in the initial reaction solution therefore is 5-25 wt-% based on the total amount of the one or more alkyl methacrylates, more preferably 7-20 wt-%, most preferably 8-14 wt-%, while the sum of the portions of the one or more alkyl methacrylates in the initial reaction solution and the second feed solution is 100 wt-%, based on the total amount of the one or more alkyl methacrylates.

Similarly, the initial reaction solution and the first feed solution both contain a portion of maleic anhydride. In a preferred embodiment, the portion of maleic anhydride in the initial reaction solution therefore is 5-25 wt-% based on the total amount of maleic anhydride, more preferably 7-20 wt-%, even more preferably 8-14 wt-%. The portion of maleic anhydride in the first feed solution preferably is 75 to 95 wt-% based on the total amount of maleic anhydride, more preferably 80 to 93 wt-%, even more preferably 86 to 92 wt-%, based on the total amount of maleic anhydride. Preferably, the sum of the portions of maleic anhydride in the initial reaction solution and the first feed solution is 50 to 100 wt-% based on the total amount of maleic anhydride, more preferably 90 to 100 wt-%, even more preferably 100 wt-%, based on the total amount of maleic anhydride.

In a preferred embodiment, the second feed solution does not comprise any maleic anhydride.

Preferably, maleic anhydride is only added to the reaction as a part of the initial reaction solution and the first feed solution. In a preferred embodiment, the portion of maleic anhydride in the initial reaction solution therefore is 5-25 wt-% based on the total amount of maleic anhydride, more preferably 7-20 wt-%, most preferably 8-14 wt-%, while the sum of the portions of maleic anhydride in the initial reaction solution and the first feed solution is 100 wt-%.

The molar ratio of the one or more alkyl methacrylates to the maleic anhydride based on the total molar amounts of these monomers used for the preparation of the copolymer preferably is in the range of 10:1 to 1:1, more preferably 5:1 to 1:1, even more preferably 3:1 to 1:1.

In the context of the present invention, the term "methacrylate" refers to esters of meth acrylic acid. The term "alkyl methacrylate" refers to esters of methacrylic acid and alcohols having the general formula $C_nH_{2n+1}OH$. The alkyl group may be branched or linear. Alkyl methacrylates may conveniently be prepared by an esterification process, in which methacrylic acid is heated together with one or more alcohols in a suitable solvent such as toluene in the presence of an esterification catalyst such as e.g. copper (II) acetate, with removal of water.

Preferred alkyl methacrylates are those prepared from alcohols having 1 to 22 carbon atoms (in the following referred to as $C_1$-$C_{22}$ alkyl methacrylates), more preferably $C_8$-$C_{22}$ alkyl methacrylates, even more preferably $C_8$-$C_{20}$ alkyl methacrylates, most preferably $C_{10}$-$C_{18}$ alkyl methacrylates.

Examples for suitable alkyl methacrylates are methyl meth)acrylate, propyl methacrylate, n-butyl methacrylate, isobutyl methacrylate, tert-butyl methacrylate, pentyl methacrylate, hexyl methacrylate, heptyl methacrylate, octyl methacrylate, nonyl methacrylate, n-decyl methacrylate, isodecyl methacrylate, undecyl methacrylate, dodecyl methacrylate, tridecyl methacrylate, tetradecyl methacrylate, pentadecyl methacrylate, hexadecyl methacrylate, heptadecyl methacrylate, octadecyl methacrylate, nonadecyl methacrylate, and eicosyl methacrylate.

The present method may employ single alkyl methacrylates or mixtures of alkyl methacrylates, preferably mixtures of the alkyl methacrylates mentioned above.

In a preferred embodiment of the present method, at least 80 mol-% more preferably at least 90 mol-%, most preferably al of the one or more alkyl methacrylates are selected from the group consisting of linear $C_6$ methacrylate, linear $C_8$ methacrylate, linear $C_{10}$ methacrylate, branched $C_{10}$ alkyl methacrylate, linear $C_{12}$ alkyl methacrylate, linear $C_{14}$ alkyl methacrylate, linear $C_{16}$ alkyl methacrylate, linear $C_{18}$ alkyl methacrylate, and mixtures thereof.

Particularly preferred is the group consisting of branched $C_{10}$ alkyl methacrylate, linear $C_{14}$ alkyl methacrylate, linear $C_{16}$ alkyl methacrylate, linear $C_{18}$ alkyl methacrylate, and mixtures thereof.

The present invention allows to use a high concentration of alkyl methacrylate and maleic anhydride of up to 60 wt.-% relative to the total weight of the initial reaction solution and the first and second feed solutions. Preferably, the total amount of the one or more alkyl methacrylates and the maleic anhydride therefore is in the range of 10 to 60 wt.-% relative to the total weight of the initial reaction solution and the first feed solution and second feed solution, more preferably in the range of 30 to 60 wt.-%, even more preferably in the range of 50 to 60 wt.-%.

The present method may also use further ethylenically unsaturated monomers in addition to the alkyl methacrylates and maleic anhydride mentioned above. The polymers resulting from the incorporation of these further monomers are also considered as copolymers according to the present invention. These additional monomers may be added as part of the initial reaction solution, the first feed solution or second feed solution, or a separate additional feed solution. If additional monomers are added, the amount of additional monomers is preferably restricted to 80 wt-% based on the total weight of monomers used, more preferably to 40 wt-%, even more preferably to 10 wt-%.

Suitable additional ethylenicaly unsaturated monomers include for example acrylic acid, methacrylic acid, (meth) acrylic compounds with functional amide or hydroxyl groups, for instance methacrylamid or hydroxyethyl methacrylate, vinylpyrrolidone, vinylmalonic acid, styrene, vinyl alcohol, vinyl acetate and/or derivatives thereof.

In an alternative embodiment, no additional ethylenically unsaturated monomers are used.

After addition of the first feed solution and second feed solution, the reaction mixture is preferably kept at the desired reaction temperature while stirring to facilitate complete incorporation of all the monomers. Typically the reaction mixture is allowed to react for up to 24 hours after addition of the first feed solution and second feed solution before the reaction is stopped, preferably for 6 to 24 hours, more preferably for 6 to 18 hours.

Suitable radical initiators are for example tert-butyl peroxy-2-ethylhexanoate, tert-amyl-peroctoate, benzoyl peroxide, di-tert-butyl peroxide, acetyl peroxide, acetyl benzoyl peroxide and azobisisobutyronitrile (AIBN). In a preferred embodiment, the radical initiator is selected from the group consisting of tert-butyl peroxy-2-ethylhexanoate, tert-amyl-peroctoate, or a mixture thereof.

The total amount of radical initiator is preferably 1 to 10 wt-% based on the total amount of monomers, more preferably 3 to 8 wt-%, even more preferably 5 to 7 wt-%.

Both the initial reaction solution and the second feed solution comprise a portion of the radical initiator. The first feed solution preferably does not contain any initiator. Preferably, a final portion of the initiator is added after addition of the feed solutions has been completed. Such an additional initiator dosage is particularly preferred to ensure maximal incorporation of the residual monomers into the copolymer composition. Preferably, each of the initial reaction solution, the second feed solution, and the final initiator dosage comprise at least 0.05 wt-% initiator based on the total amount of monomers.

The solvent used in the present method may be a single solvent or a mixture of different solvents (a solvent mixture).

Suitable solvents for the present method are for example hydrocarbons such as toluene, xylene, methylbenzene, hexane, octane, cyclohexane; aldehydes such as acetone; ketones such as methyl ethyl ketone, and isobutyl methyl ketone; alcohols such as n-butanol, and ethanol; paraffin oils; ethers such as tetrahydrofuran and dioxane; dimethylformamide, and dimethyl sulfoxide.

In a preferred embodiment a portion or all of the solvent is selected from the group consisting of methyl ethyl ketone, isobutyl methyl ketone, anisole, n-butanol, dimethylformamide, dimethyl sulfoxide, benzene (petroleum ether), acetone, 1-hexene, ethanol, ortho-xylene, and mixtures thereof. Preferably, the solvent has a high solubility for the monomers and a high boiling point. In a particularly preferred embodiment a portion or all of the solvent is selected from the group consisting of methyl ethyl ketone, isobutyl methyl ketone, anisole, dimethylformamide, dimethyl sulfoxide, and mixtures thereof. In an even more preferred embodiment the solvent is methyl isobutyl ketone. Preferably, the portion of the solvent selected from the abovementioned groups is at least 50 wt-% based on the total amount of solvent, more preferably at least 80 wt-%, even more preferably 100 wt-%.

Preferably, the solvent or solvent mixture is the same for the initial reaction solution, and the first feed solution.

The copolymers prepared by the present method have a number average molecular weight of 3000 to 9000 g/mol and a polydispersity index (defined as the ratio of the weight average to the number average molecular weight) of preferably up to 5. The number average molecular weight and the weight average molecular weight can be determined by gel permeation chromatography (GPC) against poly(methyl methacrylate) standards. A mixture of 0.2 wt-% trifluoroacetic acid in tetrahydrofuran (THF) is used as eluent.

In a second aspect, the present invention relates to a copolymer comprising one or more alkyl methacrylate monomer units and maleic anhydride monomer units, which is obtained by the process as described above and is characterized in that the number average molecular weight of the copolymer is in the range of 3000 to 9000 g/mol, wherein the number average molecular weight is determined by gel permeation chromatography against poly(methyl methacrylate) standards. The copolymers of the present invention have a polydispersity index in the range of 1 to 5, preferably in the range of 3 to 5, which is determined by gel permeation chromatography against poly(methyl methacrylate) standards. Other well-known GPC standards such as poly(styrene) can also be used.

The alkyl methacrylate monomer units comprised in the copolymers of the present invention are preferably derived from the group of alkyl methacrylates mentioned above. In a particularly preferred embodiment, the alkyl methacrylate monomer units are derived from the group consisting of linear $C_6$ methacrylate, linear $C_8$ methacrylate, linear $C_{10}$ methacrylate, branched $C_{10}$ alkyl methacrylate, linear $C_{12}$ alkyl methacrylate, linear $C_{14}$ alkyl methacrylate, linear $C_{16}$ alkyl methacrylate, linear $C_{18}$ alkyl methacrylate, and mixtures thereof.

The method of the present invention achieves a very high conversion of maleic anhydride, meaning that almost all of the maleic anhydride used for the synthesis of the copolymer is incorporated into the copolymer. Maleic anhydride has a low propensity to homo-polymerize and therefore does not form sequences of two or more maleic anhydride monomer units in the copolymer. Consequently, there is a high probability that a sequence of two or more alkyl methacrylates is interrupted by incorporation of a maleic anhydride. If the molar ratio of the one or more alkyl methacrylates to the maleic anhydride in the monomer mixture is 1:1, the method of the present invention therefore yields an alternating copolymer having an alternating sequence of acrylate and anhydride monomer units. If the molar ratio is larger than 1:1, the method yields a random copolymer.

The copolymer prepared according to the method of the present invention therefore has a low mass fraction of alkyl methacrylates in sequences of two or more consecutive monomer units relative to the total amount of alkyl methacrylates in the copolymer. Preferably, the mass fraction of alkyl methacrylates in sequences of two or more consecutive monomer units relative to the total amount of alkyl methacrylates in the copolymer is lower than 10 wt-%, more preferably lower than 5 wt-%, even more preferably lower than 2 wt-%, most preferably lower than 1 wt-%. In another preferred example, the mass fraction of alkyl methacrylates in sequences of three or more consecutive monomer units relative to the total amount of alkyl methacrylates in the copolymer is lower than 10 wt-%, more preferably lower than 5 wt-%, even more preferably lower than 2 wt-%, most preferably lower than 1 wt-%.

EXAMPLES

The following examples illustrate the present invention. In these examples, the following abbreviations are used:

| | |
|---|---|
| MIBK | methyl isobutyl ketone |
| LMA | lauryl methacrylate, comprising a mixture of linear C12, C14 and C16 methacrylates |
| LA | lauryl acrylate, comprising a mixture of linear C12, C14 and C16 acrylates |
| SMA | stearyl methacrylate, comprising a mixture of linear C14, C16, and C18 methacrylates |
| SA | stearyl acrylate, comprising a mixture of linear C14, C16, and C18 acrylates |
| BeMA | behenyl methacrylate, comprising a mixture of C18, C20 and C22 methacrylates |
| BeA | behenyl acrylate, comprising a mixture of C18, C20 and C22 acrylates |
| IDMA | isodecyl methacrylate |
| DPMA | dodecyl pentadecyl methacrylate, comprising a mixture of branched and linear C12, C13, C14 and C15 methacrylates |

-continued

| | |
|---|---|
| DPA | dodecyl pentadecyl acrylate, comprising a mixture of branched and linear C12, C13, C14 and C15 acrylates |
| MSA | maleic anhydride |

Example 1

Several copolymers of alkyl methacrylate and maleic anhydride were prepared using the method of the present invention and using different alkyl methacrylates and different comonomer molar ratios according to the following general procedure.

Solvent (MIBK), a part of the alkyl methacrylate, a part of maleic anhydride and a part of initiator (tert-butyl peroxy-2-ethylhexanoate) were added to the reaction vessel. The mixture was heated to a temperature of 90° C. to dissolve the reactants. A first feed solution comprising the rest of the maleic anhydride was added to the reaction vessel over a period of 3 hours. A second feed solution comprising the rest of the alkyl methacrylate and the free radical initiator in methyl isobutyl ketone was added to the reaction vessel over a period of 6 hours, while stirring. The total amount of MIBK was 50 wt-%, based on the total mass of the monomers and the solvent unless otherwise noted. Addition of the first and second feed solutions was started at the same time. A final additional dosage of initiator was added 2 hours after the feed solutions had been completely added. The copolymerization mixture was stirred over night before the reaction was stopped.

Copolymer 1 was prepared from a monomer mixture comprising 51 wt-% LMA, 23 wt-% SMA, and 26 wt-% MSA, based on the total amount of monomers. The initial reaction solution comprised 11.1% of the alkyl methacrylates, 11.1% of the MSA, 53.8% of the MIBK. The amount of initiator used was 1.12 wt-% in the initial reaction solution, 1.78 wt-% in the second feed solution, and 0.2 wt-% in the solution of the final additional initiator dosage, based on the total amount of monomers.

Copolymer 2 was prepared from a monomer mixture comprising 56.9 wt-% SMA, 21.1 wt-% BeMA, and 22 wt-% MSA, based on the total amount of monomers. The initial reaction solution comprised 8.9% of the alkyl methacrylates, 11.1% of the MSA, 60.2% of the MIBK. The amount of initiator used was 2 wt-% in the initial reaction solution, 3.2 wt-% in the second feed solution, and 0.2 wt-% in the solution of the final additional initiator dosage, based on the total amount of monomers.

Copolymer 3 was prepared from a monomer mixture comprising 82 wt-% IDMA and 18 wt-% MSA, based on the total amount of monomers. The initial reaction solution comprised 10.3% of the alkyl methacrylates, 11.1% of the MSA, 66.6% of the MIBK. The amount of initiator used was 2.3 wt-% in the initial reaction solution, 3.6 wt-% in the second feed solution, and 0.2 wt-% in the solution of the final additional initiator dosage, based on the total amount of monomers.

Copolymer 4 was prepared from a monomer mixture comprising 22.1 wt-% LMA, 62.9 wt-% SMA, and 15 wt-% MSA, based on the total amount of monomers. The initial reaction solution comprised 11.1% of the alkyl methacrylates, 11.1% of the MSA, 73.5% of the MIBK. The amount of initiator used was 2.5 wt-% in the initial reaction solution, 4 wt-% In the second feed solution, and 0.2 wt-% in the solution of the final additional initiator dosage, based on the total amount of monomers.

Copolymer 5 was prepared from a monomer mixture comprising 70 wt-% LMA and 30 wt-% MSA, based on the total amount of monomers. The initial reaction solution comprised 3.7% of the alkyl methacrylates, 3.7% of the MSA, 11.7% of the MIBK. The total amount of MIBK was 40 wt-%, based on the total mass of the monomers and the solvent. The amount of initiator used was 0.1 wt-% in the initial reaction solution, 1.3 wt-% in the second feed solution, and 0.2 wt-% in the solution of the final additional initiator dosage, based on the total amount of monomers.

The crude reaction product containing the copolymers of alkyl methacrylate and maleic anhydride was analyzed by gel permeation chromatography (GPC) against poly(methyl methacrylate) standards to determine the number average molecular weight $M_n$ and the weight average molecular weight $M_w$. A mixture of 0.2 wt-% trifluoroacetic acid in tetrahydrofuran (THF) is used as eluent. To determine the conversion rate of maleic anhydride, the residual amount of maleic anhydride in the crude reaction product was determined by high pressure liquid chromatography (HPLC). The residual amount of alkyl methacrylate was also determined by HPLC. HPLC was carried out using tetrahydrofuran as solvent and a Nucleosil 100-7 C18 column (125×4.6 mm). The eluent was 0.06 to 5 M phosphate buffer at a pH of 2.

The following table 1 shows the number average molecular weight data of several copolymers (Copolymers No. 1 to 5), and the residual alkyl methacrylate and maleic anhydride contents of the crude reaction products prepared using different alkyl methacrylates and comonomer molar ratios in the monomer mixture.

TABLE 1

| No. | Alkyl methacrylate composition based on C alkyl chain | $M_n$ [g/mol] | $M_w$ [g/mol] | PDI | Residual alkyl methacrylates [weight %, based on the total weight of the reaction solution (*)] | Residual maleic anhydride [weight %, based on the total weight of the reaction solution (*)] | Reaction yield [%] | Comonomer molar ratio (alkyl methacrylate:maleic anhydride) |
|---|---|---|---|---|---|---|---|---|
| 1 | C12, C14, C16, C18 linear | 6100 | 17600 | 2.93 | <0.05 | 0.25 | 99.4 | 1:1 |
| 2 | C14, C16, C18, C20, C22 linear | 6010 | 15200 | 2.52 | 0.08 | 0.004 | 99.8 | |
| 3 | C10 branched | 5770 | 14000 | 2.43 | 0.11 | 0.004 | 99.8 | 2:1 |

TABLE 1-continued

| No. | Alkyl methacrylate composition based on C alkyl chain | $M_n$ [g/mol] | $M_w$ [g/mol] | PDI | Residual alkyl methacrylates [weight %, based on the total weight of the reaction solution (*)] | Residual maleic anhydride [weight %, based on the total weight of the reaction solution (*)] | Reaction yield [%] | Comonomer molar ratio (alkyl methacrylate:maleic anhydride) |
|---|---|---|---|---|---|---|---|---|
| 4 | C12, C14, C16, C18 linear | 5560 | 15200 | 2.74 | 0.77 | 0.001 | 98.5 | |
| 5 | C12, C14, C16 linear | 5430 | 19100 | 3.51 | 0.75 | 0.03 | 98.7 | 1:1 |

(*) the total weight of the reaction solution corresponds to total weight of the initial reaction solution, the two feed solutions and the solution of the final initiator dosage As shown in Table 1, the claimed process for the specific preparation of maleic anhydride-alkyl methacrylate copolymers gives excellent conversions of both monomers maleic anhydride and alkyl methacrylate. Indeed, the residual amount of maleic anhydride according to the claimed process is never higher than 0.25 weight % and the residual amount of alkyl methacrylate according to the claimed process is never higher than 0.77 weight %, based on the total weight of the reaction solution (see Table 1 above). Consequently, the compositions of the copolymers obtained by the claimed process correspond to the compositions of the respective monomers in the reaction mixture.

Furthermore, the copolymers obtained according to the claimed process have the desired number average molecular weights (all below 9000 g/mol) and are obtained with excellent yields of minimum 98.5%.

Example 2 (Comparative Example)

The following example illustrates a method for a solution polymerization according to EP 0636637 A2.

A solution of maleic anhydride in toluene was fed into a reaction vessel and heated to the reaction temperature of 80° C. When the maleic anhydride had dissolved, a radical initiator (AIBN) in toluene was introduced into the reaction vessel. A solution of alkyl methacrylate or alkyl acrylate was added to the reaction vessel over a period of 4 hours.

Using this general procedure, examples 1, 2 and 3 of EP 0636637 A2 were reproduced to prepare eight different copolymers.

Copolymer 1 was prepared from 72.7 wt-% DPMA and 27.3 wt-% MSA, based on the total amount of monomers.

Copolymer 2 was prepared from 73.1 wt-% DPA and 26.9 wt-% MSA, based on the total amount of monomers.

Copolymer 3 was prepared from 73.7 wt-% DPMA and 26.3 wt-% MSA, based on the total amount of monomers.

Copolymer 4 was prepared from 76.1 wt-% SA and 23.9 wt-% MSA, based on the total amount of monomers.

Copolymer 5 was prepared from 76.9 wt-% SMA and 23.1 wt-% MSA, based on the total amount of monomers.

Copolymer 6 was prepared from 70 wt-% IDMA and 30 wt-% MSA, based on the total amount of monomers.

Copolymer 7 was prepared from 78.7 wt-% BeA and 26.3 wt-% MSA, based on the total amount of monomers.

Copolymer 8 was prepared from 78.2 wt-% BeMA and 21.8 wt-% MSA, based on the total amount of monomers.

The copolymers thus obtained were analyzed using the procedures described above for example 1. The results are shown in the following Table 2 (see Copolymers No. 1 to No. 8 in Table 2 below).

TABLE 2

| No. | Alkyl (meth)acrylate composition based on C alkyl chain | Mn [g/mol] | Mw [g/mol] | PDI | Residual alkyl (meth)acrylates [weight %, based on the total weight of the reaction solution (*)] | Residual maleic anhydride [weight %, based on the total weight of the reaction solution (*)] | Reaction yield [%] | Comonomer molar ratio (alkyl methacrylate:maleic anhydride) |
|---|---|---|---|---|---|---|---|---|
| 1 | C12, C13, C14, C15 linear methacrylate (example 1) | 17500 | 61700 | 3.53 | 0.22 | 3.22 | 85.5 | 1:1 |
| 2 | C12, C13, C14, C15 linear acrylate (example 1) | 11400 | 20300 | 1.79 | 4.20 | 5.36 | 60.3 | |
| 3 | C12, C13, C14, C15 linear methacrylate (example 1) | 26800 | 54100 | 2.02 | 1.09 | 4.29 | 78.2 | |
| 4 | C14, C16, C18 linear acrylate (example 1) | 16600 | 28100 | 1.69 | 6.48 | 5.44 | 56.1 | |

TABLE 2-continued

| No. | Alkyl (meth)acrylate composition based on C alkyl chain | Mn [g/mol] | Mw [g/mol] | PDI | Residual alkyl (meth)acrylates [weight %, based on the total weight of the reaction solution (*)] | Residual maleic anhydride [weight %, based on the total weight of the reaction solution (*)] | Reaction yield [%] | Comonomer molar ratio (alkyl methacrylate:maleic anhydride) |
|---|---|---|---|---|---|---|---|---|
| 5 | C14, C16, C18 linear methacrylate (example 1) | 28100 | 61000 | 2.17 | 1.08 | 4.31 | 80.8 | |
| 6 | C10 branched methacrylate (example 2) | 17800 | 64100 | 3.61 | 0.04 | 4.06 | 25.6 | |
| 7 | C18, C20, C22 linear acrylate (example 3) | 45700 | 92000 | 2.01 | 0.01 | 4.08 | 89.2 | |
| 8 | C18, C20, C22 linear methacrylate (example 3) | 18100 | 32500 | 1.80 | 3.07 | 5.04 | 78.2 | |

(*) the total weight of the reaction solution corresponds to total weight of the reaction mixture (solvent, monomers, initiator)

The data shown in Table 2 demonstrate that the copolymerization of alkyl methacrylate or alkyl acrylate and maleic anhydride according to the process described in EP 0636637 A2 results in a higher residual amount of maleic anhydride as compared to the process of the present invention. Indeed, in the particular case of maleic anhydride-alkyl methacrylate copolymers, the residual amount of maleic anhydride is in the range of 3.22 to 5.04 weight %, based on the total weight of the reaction solution, according to the process of EP 0636637 A2, whereas the residual amount of maleic anhydride according to the claimed process is never higher than 0.25 weight %, based on the total weight of the reaction solution (see Table 1 above). The conversion of maleic anhydride according to the claimed process for the specific preparation of maleic anhydride-alkyl methacrylate copolymers has thus been drastically improved in comparison to the conversions obtained with the prior art process.

Furthermore, the overall reaction yields of the comparative examples 1 to 8 reproduced according to the process in EP 0636637 A2 are low with values ranging from 25.6% to 89.2%, whereas the claimed process results in yields well above 98% (see Table 1).

Example 3 (Comparative Example)

In the following comparative example, copolymers of methacrylate and maleic anhydride are prepared under the reaction conditions of the solution copolymerization process disclosed in CN 1302031 C.

A mixture of maleic anhydride in toluene was charged into a reaction vessel and heated to a reaction temperature of 60° C. The reaction mixture was purged with nitrogen gas for 30 minutes. When the maleic anhydride was completely dissolved, alkyl methacrylate was added and the reaction was started by addition of radical initiator. Instead of AIBN, the radical initiator 2,2'-Azobis-(2-methylbutyronitrile) (AMBN) was used. Both initiators are azo compounds having a similar half-life period.

Two different copolymers were prepared (Copolymers No. 1 and No. 2 In Table 3 below). Copolymer 1 was prepared from 53.3 wt-% LMA; 21.7 wt-% SMA, and 26 wt-% MSA, based on the total amount of monomers. Copolymer 2 was prepared from 56.9 wt-% SMA, 21.1 wt-% BeMA, and 22 wt-% MSA, based on the total amount of monomers.

The results are given in the following Table 3.

TABLE 3

| No. | Alkyl methacrylate composition based on C alkyl chain | Mn [g/mol] | Mw [g/mol] | PDI | Residual alkyl methacrylates [weight %, based on the total weight of the reaction solution (*)] | Residual maleic anhydride [weight %, based on the total weight of the reaction solution (*)] | Reaction yield [%] | Monomer molar ratio (alkyl methacrylate:maleic anhydride) |
|---|---|---|---|---|---|---|---|---|
| 1 | C12, C14, C16, C18 linear | 402000 | 729000 | 1.82 | 21.90 | 5.65 | 19.2 | 1:1 |
| 2 | C12, C14, C16, C18 linear | 370000 | 796000 | 2.15 | 9.20 | 6.59 | 53.7 | |

(*) the total weight of the reaction solution corresponds to total weight of the reaction mixture (solvent, monomers, initiator)

The results show that the polymerization process according to CN 1302031 C results in product mixtures containing high amounts of residual monomers, both related to alkyl methacrylate and maleic anhydride and therefore very low yields of 19.2% and 53.7%. Furthermore, the obtained polymers do not comprise number average molecular weights in the desired range of 3000 to 9000 g/mol. In contrast, the resulting copolymers 1 and 2 of Table 3 have a very high number average molecular weight.

Copolymer No. 2 of Table 3 was prepared according to CN 1302031 C from exactly the same monomer composition as copolymer No. 2 in Table 1, which was synthesized according to the claimed process. In case of the claimed process, a number average molecular weight of 6 010 g/mol was obtained versus a number average molecular weight of 370 000 g/mol in case of the process according to CN 1302031 C. Furthermore, the residual amounts of monomers are very low in case of copolymer 2 prepared according to the claimed process with values of 0.08% residual alkyl methacrylate and 0.004% maleic anhydride, whereas in case of copolymer 2 prepared according to the process of CN 1302031 C, the amounts of residual monomers were high with values of 9.20% residual alkyl methacrylate and 6.59% maleic anhydride. This is also reflected in the yields: copolymer 2 of Table 1, prepared according to the claimed process, was obtained in a yield of 99.8%, whereas copolymer 2 of Table 3, prepared according to CN 1302031 C, was obtained in a yield of 53.7%.

Example 4 (Comparative Example)

The following example represents a solution polymerization process according to CN 1328392 C.

A solution of maleic anhydride in xylene was heated to a reaction temperature of 140° C. Subsequently, two separate solutions of radical initiator in xylene and alkyl methacrylate in xylene were added dropwise within 3 hours. The alkyl methacrylate solution also contained n-dodecyl mercaptan as change transfer agent. The mixture was then continuously refluxed for 2 to 4 hours to obtain the alkyl methacrylate/maleic anhydride copolymer. The resulting copolymer composition as analyzed as described above.

Six different copolymers were prepared (Copolymers No. 1 to No. 6 in Table 4 below). Copolymer 1 was prepared from 70 wt-% IDMA and 30 wt-% MSA, based on the total amount of monomers. Copolymer 2 was prepared from 52.3 wt-% LMA, 21.7 wt-% SMA, and 26 wt-% MSA, based on the total amount of monomers. Copolymer 3 was prepared from 19.8 wt-% LMA, 56.2 wt-% SMA, and 24 wt-% MSA, based on the total amount of monomers. Copolymer 4 was prepared from 56.9 wt-% SMA, 21.1 wt-% BeMA, and 22 wt-% MSA, based on the total amount of monomers. Copolymer 5 was prepared from 85 wt-% IDMA and 15 wt-% MSA, based on the total amount of monomers. Copolymer 6 was prepared from 22.5 wt-% LMA, 64 wt-% SMA, and 13.5 MSA, based on the total amount of monomers.

The results are given in the following Table 4.

TABLE 4

| No. | Alkyl methacrylate composition based on average C alkyl chain | Mn [g/mol] | Mw [g/mol] | PDI | Residual alkyl methacrylates [weight %, based on the total weight of the reaction solution (*)] | Residual maleic anhydride [weight %, based on the total weight of the reaction solution (*)] | Reaction Yield [%] | Comonomer molar ratio (alkyl methacrylate:maleic anhydride) |
|---|---|---|---|---|---|---|---|---|
| 1 | C10 branched | 1450 | 2730 | 2.13 | 0.25 | 0.0001 | 99.4 | 1:1 |
| 2 | C12, C14, C16, C18 linear | 1740 | 3440 | 1.98 | 0.80 | 0.0002 | 98.1 | |
| 3 | C12, C14, C16, C18 linear | 2270 | 4950 | 2.18 | 1.10 | 0.0009 | 97.4 | |
| 4 | C14, C16, C18, C20, C22 linear | 1990 | 3780 | 2.88 | 0.56 | 0.0002 | 98.7 | |
| 5 | C10 branched | 1620 | 3550 | 2.19 | 3.20 | 0.0001 | 92.5 | 2:1 |
| 6 | C12, C14, C16, C18 linear | 2000 | 5040 | 2.52 | 0.54 | 0.0002 | 98.7 | |

(*) the total weight of the reaction solution corresponds to total weight of the reaction mixture (solvent, monomers, initiator)

As these results show, the process according to CN 1328392 C results in an excellent conversion rate of maleic anhydride. However, the copolymers do not have the desired number average molecular weight and contain sulfur due to the presence of n-dodecyl mercaptan in the polymerization reaction.

Copolymer No. 4 of Table 4 was prepared according to CN 1328392 C from exactly the same monomer composition as copolymer No. 2 in Table 1, which was synthesized according to the claimed process. In case of the claimed process, a number average molecular weight of 6010 g/mol was obtained versus a number average molecular weight of 2000 g/mol in case of the process according to CN 1328392 C. The residual amounts of monomers are very low both cases with values of 0.08% residual alkyl methacrylate and 0.004% maleic anhydride in case of the claimed process and 0.54% residual alkyl methacrylate and 0.0002% maleic anhydride in case of the process according to CN 1328392 C. The copolymers obtained with the process according to CN 1328392 C are not sulfur-free copolymers.

However, the reaction conditions according to CN 1328392 C do not allow controlling the number average molecular weight of the copolymer to produce copolymers with the required number average molecular weight range, while maintaining high conversion of maleic anhydride into the copolymer. The resulting copolymers are also not sulfur-free.

Example 5 (Comparative Example)

The following example represents the polymerization process according to U.S. Pat. No. 5,178,641A.

According to the process disclosed in U.S. Pat. No. 5,178,641A, a solution of alkyl acrylate and maleic anhydride in solvent naphtha 150 was heated upon stirring to the reaction temperature in nitrogen flow. After reaching the target reaction temperature, the radical initiator solution was added continuously to the reaction mixture within four hours. Subsequently, a further portion of the radical initiator was added, and the reaction mixture was kept stirring for 1 hour.

Five different copolymers were prepared according to the above-indicated process of U.S. Pat. No. 5,178,641A, using respectively alkyl methacrylate or alkyl acrylate together with maleic anhydride (Copolymers No. 1 to No. 5 in Table 5 below).

Copolymers No. 1 to 5 were prepared using the reaction conditions of example 1 in U.S. Pat. No. 5,178,641 A, involving a reaction temperature of 80° C. and AIBN as initiator.

Copolymer 1 was prepared from 72.7 wt-% LA and 27.3 wt-% MSA, based on the total amount of monomers.

Copolymer 2 was prepared from 71.6 wt-% LMA and 28.4 wt-% MSA, based on the total amount of monomers.

Copolymer 3 was prepared from 86.3 wt-% LA and 13.7 wt-% MSA, based on the total amount of monomers.

Copolymer 4 was prepared from 87.1 wt-% LMA and 12.9 wt-% MSA, based on the total amount of monomers.

Copolymer 5 was prepared from 89.0 wt-% SA and 11.0 wt-% MSA, based on the total amount of monomers.

The results are given in the following table 5 (see Copolymers No. 1 to No. 5 in Table 5 below).

and 0.58 weight % for copolymers 1 and 2, respectively), it can be derived that the composition of the polymer obtained by the process described in U.S. Pat. No. 5,178,641 A is totally different from the copolymers obtained by the claimed process. Indeed, the alkyl methacrylate monomers nearly fully react during the polymerization reaction, whereas the second maleic anhydride monomers only partially react (as shown by the residual amount of maleic anhydride at the end of the reaction). Therefore, the copolymers obtained by the process described in U.S. Pat. No. 5,178,641 A do not comprise an equimolar composition of both repeating units, maleic anhydride versus alkyl acrylate or alkyl methacrylate, whereas the copolymers obtained by the claimed process do.

Furthermore, the yields obtained with the process of U.S. Pat. No. 5,178,641 A are lower than the yields obtained with the claimed process.

The invention claimed is:

1. A sulfur-free copolymer, consisting of as copolymerized units one or more alkyl methacrylates, maleic anhydride, and from greater than 0 wt % to 10 wt % of an ethylenically unsaturated monomer selected from the group consisting of acrylic acid, methacrylic acid, methacrylamide, hydroxyethyl methacrylate, vinylpyrrolidone, vinylmalonic acid, styrene, vinyl alcohol and vinyl acetate;
wherein
a number average molecular weight of the copolymer is in the range of 3000 to 9000 g/mol,

TABLE 5

| No. | Alkyl (meth)acrylate composition based on average C alkyl chain | Mn [g/mol] | Mw [g/mol] | PDI | Residual alkyl (meth)acrylates [weight %, based on the total weight of the reaction solution (*)] | Residual maleic anhydride [weight %, based on the total weight of the reaction solution (*)] | Reaction yield [%] | Comonomer molar ratio (alkyl methacrylate:maleic anhydride) |
|---|---|---|---|---|---|---|---|---|
| 1 | C12, C14 linear acrylate | 21300 | 71700 | 3.37 | 0.02 | 6.84 | 84.0 | 1:1 |
| 2 | C12, C14 linear methacrylate | 8370 | 17400 | 2.08 | 0.58 | 6.97 | 82.1 | |
| 3 | C12, C14 linear acrylate | 21700 | 55100 | 2.54 | 2.20 | 2.73 | 90.1 | 2.5:1 |
| 4 | C12, C14 linear methacrylate | 64400 | 324000 | 5.04 | 0.01 | 1.47 | 97.1 | |
| 5 | C14, C16, C18 linear acrylate | 25900 | 84800 | 3.28 | 1.74 | 1.57 | 94.2 | |

(*) the total weight of the reaction solution corresponds to total weight of the reaction mixture (solvent, monomers, initiator)

The results show that all copolymers prepared according to the process of U.S. Pat. No. 5,178,641 A do not comprise the full amount of each monomer used in the reaction mixture. For example, in the case of equimolar monomer ratios among alkyl acrylate or alkyl methacrylate versus maleic anhydride as present in copolymers 1 and 2, a very high amount of residual maleic anhydride remains in the product mixture and the yield therefore is low when using the polymerization process according to U.S. Pat. No. 5,178,641A.

Furthermore, taking into account, on the first hand, the conversion of maleic anhydride, and on the other hand, the residual amount of alkyl acrylate or alkyl methacrylate (0.02 the number average molecular weight being determined by gel permeation chromatography against poly(methyl methacrylate) standards,
a polydispersity index of the copolymer is in the range of 1 to 5, the polydispersity index being determined by gel permeation chromatography against poly(methyl methacrylate) standards, and
a molar ratio of the one or more alkyl methacrylates to the maleic anhydride in the sulfur-free copolymer is in the range of from 10:1 to 1:1, corresponding to the total molar amounts of the one or more alkyl methacrylates and maleic anhydride used for the preparation of the sulfur-free copolymer; and a mass fraction of alkyl methacrylates in sequences of three or more consecutive monomer units relative to the total amount of alkyl methacrylates in the copolymer is lower than 10 wt-%;
and
wherein the sulfur free copolymer is obtained by a process, comprising:
a) providing an initial reaction solution comprising a portion of the one or more alkyl methacrylates, a portion of the maleic anhydride, a portion of the initiator and a portion of the solvent;
b) heating the initial solution to a reaction temperature;
c) preparing a reaction mixture by adding a first feed solution comprising a further portion of the maleic anhydride and a further portion of the solvent to the initial reaction solution, and without any initiator;
d) adding a second feed solution comprising a further portion of the one or more alkyl methacrylates, and a further portion of the radical initiator to the initial reaction solution at the reaction temperature, and
e) adding a final portion of the initiator after addition of the feed solutions has been completed;

wherein
the method does not comprise a sulfur chain transfer agent,
a molar ratio of the total of the portions of alkyl methacrylate monomer employed in the reaction to the total of the portions of the maleic anhydride employed in the reaction is from 10:1 to 1:1,
the additions of both first and second feed solutions are started at the same time, and the duration of the additions of the first and second feed solutions are adjusted such that addition of the first feed solution is completed faster than the addition of the second feed solution.

2. The sulfur-free copolymer according to claim 1, wherein equimolar amounts of the one or more alkyl methacrylates and maleic anhydride are present in the sulfur free copolymer, corresponding to the total molar amounts of the one or more alkyl methacrylates and maleic anhydride used for the preparation of the sulfur-free copolymer.

* * * * *